(12) United States Patent
Noguchi et al.

(10) Patent No.: US 7,357,413 B2
(45) Date of Patent: Apr. 15, 2008

(54) CURTAIN AIRBAG DEVICE

(75) Inventors: Atsushi Noguchi, Moriyama (JP);
Tetsu Mitsuo, Nissin (JP)

(73) Assignee: Takata Corporation, Tokyo (JP)

( * ) Notice: Subject to any disclaimer, the term of this patent is extended or adjusted under 35 U.S.C. 154(b) by 324 days.

(21) Appl. No.: 11/153,434

(22) Filed: Jun. 16, 2005

(65) Prior Publication Data
US 2005/0285378 A1 Dec. 29, 2005

(30) Foreign Application Priority Data
Jun. 29, 2004 (JP) ............................. 2004-191675

(51) Int. Cl.
*B60R 21/16* (2006.01)

(52) U.S. Cl. .............. 280/730.2; 280/743.1; 280/743.2; 280/749

(58) Field of Classification Search ............ 280/730.2, 280/749, 743.1, 743.2
See application file for complete search history.

(56) References Cited

U.S. PATENT DOCUMENTS

| 5,865,465 | A | 2/1999 | Bauer et al. | |
|---|---|---|---|---|
| 6,237,938 | B1 | 5/2001 | Boxey | |
| 6,237,943 | B1 * | 5/2001 | Brown et al. | 280/730.2 |
| 6,375,216 | B1 | 4/2002 | Eschbach | |
| 6,527,296 | B2 | 3/2003 | Bakhsh et al. | |
| 6,783,152 | B2 | 8/2004 | Tanase et al. | |
| 6,866,293 | B2 | 3/2005 | Ogata | |
| 7,125,039 | B2 * | 10/2006 | Bossecker et al. | 280/730.2 |
| 7,134,682 | B2 * | 11/2006 | Totsuka et al. | 280/728.2 |
| 2002/0027341 | A1 | 3/2002 | Bakhsh et al. | |
| 2004/0012174 | A1 * | 1/2004 | Tanaka et al. | 280/730.2 |
| 2004/0178608 | A1 | 9/2004 | Noguchi | |
| 2005/0046159 | A1 | 3/2005 | Noguchi et al. | |
| 2005/0116450 | A1 | 6/2005 | Noguchi | |
| 2005/0134029 | A1 | 6/2005 | Noguchi et al. | |
| 2005/0134030 | A1 | 6/2005 | Noguchi et al. | |

FOREIGN PATENT DOCUMENTS

| DE | 100 21 577 A1 | 11/2000 |
|---|---|---|
| DE | 101 47 965 A1 | 10/2002 |
| EP | 1 510 414 A1 | 3/2005 |
| EP | 1 510 416 A1 | 3/2005 |
| EP | 1 538 033 A1 | 6/2005 |
| JP | 2003-54351 A | 2/2003 |
| JP | 2004-67045 A | 3/2004 |

\* cited by examiner

*Primary Examiner*—Eric Culbreth
(74) *Attorney, Agent, or Firm*—Foley & Lardner LLP

(57) ABSTRACT

A curtain airbag device and a guiding element that achieve a simplified installation process for attaching a curtain airbag to a vehicle body, and that allow the curtain airbag to be deployed smoothly. When an inflator is activated, a curtain airbag may be deployed downward. A rear portion of the deploying curtain airbag may be guided along a guide rod via a link strap. The curtain airbag may be folded in a zigzag manner along folding lines extending in a horizontal direction. The link strap may protrude from a bottom corner area of the curtain airbag and have a base end which is disposed at a side of the folded curtain airbag proximate a vehicle body.

11 Claims, 2 Drawing Sheets

CURTAIN AIRBAG DEVICE

BACKGROUND

The present invention relates to a curtain airbag device provided with a curtain airbag that can be deployed along an inner side surface of a vehicle cabin.

In a vehicle provided with a curtain airbag device of related art, when the vehicle is involved in an accident, such as a side-on collision or rollover, a curtain airbag is deployed downward along an inner side surface (for example, doors and pillars) of the vehicle cabin so as to protect the head of a vehicle occupant and to keep the vehicle occupant inside the vehicle cabin.

U.S. Pat. No. 6,237,938 (incorporated by reference herein) discloses an example of a guiding element disposed along a C pillar. Specifically, such a guiding element is used for guiding a rear portion of a curtain airbag downward along the pillar when the curtain airbag is being inflated along the inner side surface of a vehicle cabin.

Moreover, such a guiding element includes a track member having a box-shaped cross-section and a sliding component disposed within the track member that is movable in the longitudinal direction of the track member. The rear portion of the curtain airbag is tied to the sliding component. For holding the rear portion of the curtain airbag at the bottom-most point of deployment, the track member is provided with latches disposed at a regular interval across the entire length of the track member.

SUMMARY OF THE INVENTION

It is an object of at least one embodiment of the present invention to provide a curtain airbag device that achieves a simplified installation process for attaching a curtain airbag to a main body, and that allows the curtain airbag to be guided smoothly along a guiding element during the deployment process.

According to an embodiment of the present invention, a curtain airbag device for a vehicle includes a curtain airbag that deploys along an inner side surface of the vehicle, a gas generator for supplying the curtain airbag with gas in order to inflate the curtain airbag, a guiding element extending in a vertical direction and mounted on an interior of the vehicle, the guiding element guiding the curtain airbag when the curtain airbag is being deployed downward, and a linking member which protrudes from a lower edge of the curtain airbag, wherein the linking member is attached to an exterior of the guiding element so that the linking member is guided along the exterior of the guiding element, wherein a base end of the linking member is disposed at a side of the curtain airbag proximate a vehicle body.

According to an embodiment of the present invention, a curtain airbag device for a vehicle includes a curtain airbag that deploys downward along an inner side surface of a vehicle cabin, a gas generator for supplying the curtain airbag with gas in order to inflate the curtain airbag, a guiding element extending in a vertical direction and mounted on an interior of the vehicle, the guiding element guiding the curtain airbag when the curtain airbag is being deployed downward, and a linking member which protrudes from a lower edge of the curtain airbag, wherein the linking member is attached to an exterior of the guiding element so that the linking member is guided along the exterior of the guiding element, wherein a base end of the link strap is disposed at a side of the folded curtain airbag proximate to an inside of a vehicle cabin, and wherein the link strap extends around a lower side of the folded curtain airbag toward a vehicle body.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Embodiments of the present invention will be described below with reference to the drawings.

Figure 1A:
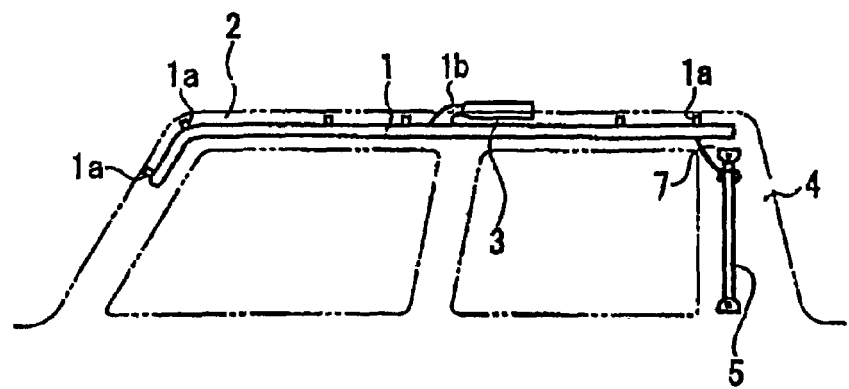
FIG. 1(a) is a side view illustrating the inside of a vehicle cabin provided with a curtain airbag device, according to an embodiment of the present invention.

According to an embodiment of the present invention, a curtain airbag 1 is disposed along a roof side 2 of a vehicle (i.e. a border section of a vehicle cabin where the ceiling and an inner side surface meet) so as to extend longitudinally in a front-rear direction of the vehicle, as shown in FIG. 1(a). When the vehicle is involved in an accident, such as a side-on collision or rollover, the curtain airbag 1 is inflated as a result of gas being sent from an inflator (gas generator) 3. The curtain airbag 1 is thus deployed downward of the vehicle body along the inner side surface of the vehicle cabin including, for example, doors and pillars. An upper edge of the curtain airbag 1 is provided with tabs 1a, which are mounted on the roof side 2.

A projection 1b extends upward from the upper edge of the curtain airbag 1 and is disposed at a central part of the upper edge with respect to the longitudinal direction of the curtain airbag 1. The projection 1b is provided with a gas-entrance hole 1c. An end of the inflator 3 is inserted through the gas-entrance hole 1c and is tied thereto with a band (not shown).

One of the pillars in the vehicle (a C pillar 4 in this embodiment) has a guide rod 5 attached thereto. The guide rod 5 may be attached to other pillars in a vehicle, such as A or B pillars. The guide rod 5 defines a guiding element for guiding the rear portion of the curtain airbag 1 along the C pillar 4 when the curtain airbag 1 is being inflated in the downward direction of the vehicle body along the C pillar 4. The guide rod 5 may have a rod-like or tube-like structure which extends in the vertical direction of the vehicle body along the C pillar 4. Both upper and lower ends of the guide rod 5 are fixed to the C pillar 4. The ends of the guide rods may be fixed with bolts, screws, ties, or other fastening means known in the art.

A link strap 7 may protrude from a bottom corner area in the rear portion of the curtain airbag 1, and an end of the link strap 7 may be loosely tied around the guide rod 5. The link strap 7 may be vertically movable along the guide rod 5.

Alternatively, the end of the link strap 7 may be provided with a ring, and in that case, the ring may be passed through and attached to the guide rod 5.

Although not shown in the drawings, the roof side 2 may be provided with a roof-side garnish which covers the curtain airbag 1.

Figure 2A:
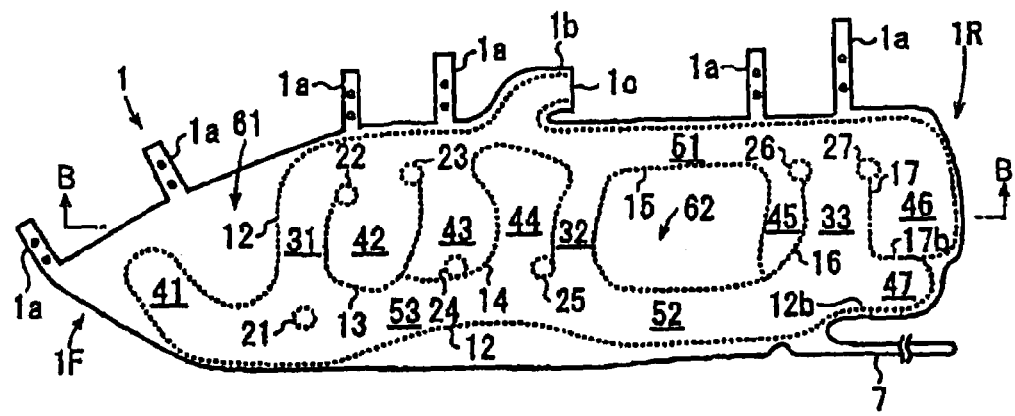
FIG. 2(a) is a side view of a curtain airbag in a deployed state, according to an embodiment of the present invention.
Figure 2B:
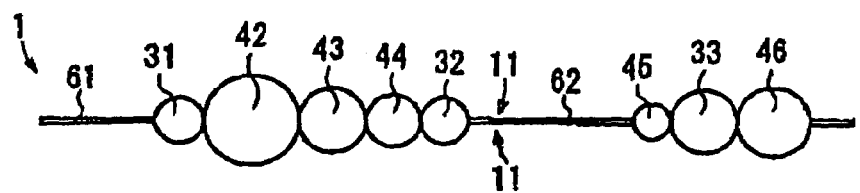
FIG. 2(b) is a cross-sectional view taken along line B-B in FIG. 2(a).

As seen in FIGS. 2(*a*) and 2(*b*), the curtain airbag 1 may include two sheets 11 having substantially the same shape, such that one of the sheets faces the inner side surface of the vehicle cabin and the other faces the inside of the vehicle cabin. The two sheets 11 may be connected to each other via linear connected portions 12, 13, 14, 15, 16, 17 and circular connected portions 21, 22, 23, 24, 25, 26, 27, so as to form vertical chambers 31, 32, 33, bag chambers 41, 42, 43, 44, 45, 46, 47, horizontal chambers 51, 52, 53, and non-inflatable portions 61 and 62.

The linear connected portions 12 to 17 and the circular connected portions 21 to 27 hermetically may combine the sheets 11 together. For the connection between the two sheets 11, high-strength connecting means (such as stitching with high-strength threads, bonding with an adhesive having high adhesivity, or welding) may be used so that the two sheets 11 are prevented from being separated from each other even when the pressure inside the curtain airbag 1 reaches an upper limit pressure value.

The linear connected portion 12 may extend substantially around the periphery of the curtain airbag 1. However, at a front portion 1F of the curtain airbag 1, the linear connected portion 12 may extend downward from the upper edge of the front portion 1F in a substantially U-shaped manner. This forms the non-inflatable portion 61 along the upper edge of the front portion 1F and the bag chamber 41 at the front-most part of the front portion 1F.

The linear connected portion 12 may extend along an edge of the projection 1b of the curtain airbag 1, but may be cut off at a rear edge section of the projection 1b so as to form the gas-entrance hole 1c of the curtain airbag 1.

The linear connected portion 13 may be disposed slightly towards the front of the curtain airbag 1 from the center of the curtain airbag 1. The linear connected portion 13 may be U-shaped, with its inner region forming the bag chamber 42. The upper portion of the bag chamber 42 communicates with the gas-entrance hole 1c, whereas the lower portion has no opening.

The linear connected portion 13 and a part of the linear connected portion 12 at the front portion 1F of the curtain airbag 1 may have the vertical chamber 31 disposed therebetween. The upper portion of the vertical chamber 31 may communicate with the gas-entrance hole 1c, and the lower portion may communicate with the bag chamber 41 and the horizontal chamber 53. To prevent the lower portion of the vertical chamber 31 from being over-inflated, the circular connected portion 21 may be provided.

The linear connected portion 14 may be substantially S-shaped and may be disposed at the central part of the curtain airbag 1 with respect to the front-rear direction of the curtain airbag 1. The inner regions of the linear connected portion 14 may respectively form the bag chambers 43 and 44. The upper portion of the bag chamber 43 may communicate with the gas-entrance hole 1c, whereas the lower portion has no openings. On the other hand, the lower portion of the bag chamber 44 may communicate with the horizontal chamber 53 and the lower portion of the vertical chamber 32, whereas the upper portion has no openings.

The horizontal chamber 53 may be disposed below the bag chambers 42, 43, and 44. The linear connected portion 14 and the linear connected portion 15, which will be described below, may have the vertical chamber 32 disposed therebetween. The upper portion of the vertical chamber 32 may communicate with the gas-entrance hole 1c.

The linear connected portion 15 may be disposed slightly towards the back of the curtain airbag 1 from the center of the curtain airbag 1. The linear connected portion 15 may be substantially square-shaped. The upper side and the lower side of the linear connected portion 15 may be respectively distant from the upper side and the lower side of the linear connected portion 12. Thus, the horizontal chamber 51 may be formed between the upper side of the linear connected portion 12 and the upper side of the linear connected portion 15, and the horizontal chamber 52 may be formed between the lower side of the linear connected portion 12 and the lower side of the linear connected portion 15.

The inner region of the linear connected portion 15 may be blocked off from the gas-entrance hole 1c so as to form the non-inflatable portion 62.

At the rear portion of the curtain airbag 1, the linear connected portion 16 may extend in the vertical direction. Moreover, further towards the back of the curtain airbag 1, the linear connected portion 17 may be provided. The linear connected portion 17 may have a substantially L-shape.

The linear connected portions 15 and 16 may have the bag chamber 45 disposed therebetween. The upper portion of the bag chamber 45 may communicate with the horizontal chamber 51.

The linear connected portions 16 and 17 may have the vertical chamber 33 therebetween. The upper and lower portions of the vertical chamber 33 may respectively communicate with the horizontal chambers 51 and 52.

The bag chamber 46 may be formed between the linear connected portion 17 and a part of the linear connected portion 12 extending along a rear portion 1R of the curtain airbag 1. The upper portion of the bag chamber 46 may communicate with the upper portion of the vertical chamber 33, whereas the lower portion of the bag chamber 46 may have no openings.

A lower segment 17b of the linear connected portion 17 may be connected with the linear connected portion 12. The lower segment 17b of the linear connected portion 17 and a lower-rear segment 12b of the linear connected portion 12 may have the bag chamber 47 disposed therebetween. The front portion of the bag chamber 47 may communicate with the lower portion of the vertical chamber 33, whereas the rear portion of the bag chamber 47 may have no openings.

Each of the circular connected portions 22 to 27 may be provided for reinforcing an end or an intermediate section of the corresponding one of the linear connected portions 13, 14, 16, and 17.

The link strap 7 may be positioned below the vertical chamber 33, and may be a segment of the combined sheets 11 extending in an elongated manner.

Figure 1B:
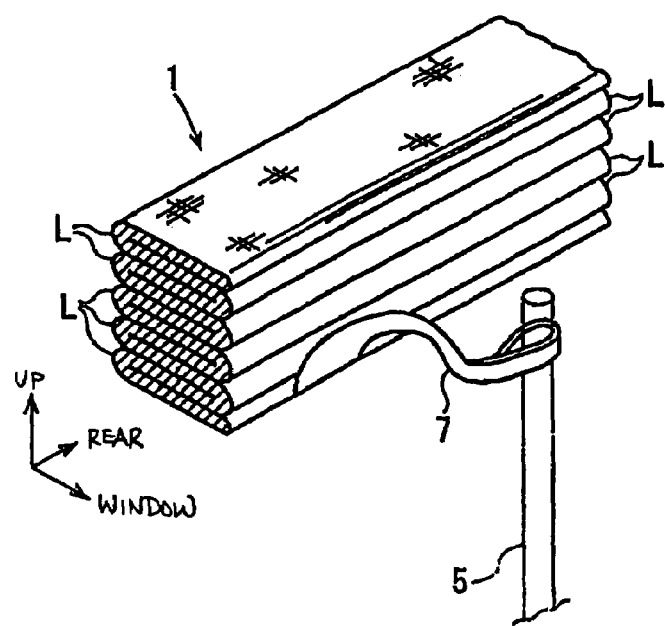
FIG. 1(b) is a schematic view of a curtain airbag in a folded state, according to an embodiment of the present invention.

In order to fold up the curtain airbag 1, the curtain airbag 1 may be folded in a zigzag manner along folding lines L extending in the longitudinal direction of the curtain airbag 1. The folding lines L may be parallel to the upper edge of the curtain airbag 1. Referring to FIG. 1(*b*), when the curtain airbag 1 is in a folded state, a base end of the link strap 7 may be disposed at a side of the folded curtain airbag proximate the vehicle body.

When a vehicle provided with such a curtain airbag device is involved in an accident, such as a side-on collision or a rollover, the inflator 3 generates gas so as to start an inflation process for the curtain airbag 1. The curtain airbag 1 may then push open the roof-side garnish and pass over the upper end of the pillar garnish towards the inside of the vehicle cabin. Subsequently, the curtain airbag 1 may then deploy downward along the surface of the pillar garnish facing the inside of the vehicle cabin.

The rear portion of the deploying curtain airbag 1 may be guided along the guide rod 5 via the link strap 7. The link strap 7 may start moving downward along the guide rod 5 when the curtain airbag 1 begins to deploy. In this case, the link strap 7 may move downward while ripping through the pillar garnish and a weather strip.

Furthermore, the link strap 7 may move downward along the guide rod 5 with the curtain airbag 1 until the curtain airbag 1 reaches the bottom-most point of deployment. Because the curtain airbag 1 may be guided along the guide rod 5 via the link strap 7, the curtain airbag 1 may be deployed along the side surface of the vehicle cabin.

According to this embodiment, since the link strap 7 may be disposed at the side of the folded curtain airbag proximate the vehicle body, the link strap 7 does not complicate the installation process for attaching the folded curtain airbag to the roof side 2 of the vehicle body.

Furthermore, when the curtain airbag 1 is being deployed downward, the link strap 7 may be pulled downward by the lower edge of the curtain airbag 1 so as to move smoothly along the guide rod 5.

When the gas generator is activated in this curtain airbag device, the curtain airbag is deployed downward. In this case, because the base end of the link strap is disposed at the side of the curtain airbag proximate the vehicle body, the link strap moves downward smoothly while being pulled by the curtain airbag.

The embodiment described above is only an example of the present invention, and the present invention is not limited to the above embodiment. For example, the number or the positions of the vertical chambers and the bag chambers may be set different from those shown in the drawings.

Although not shown in the drawings, the present invention may have an alternative structure in which the curtain airbag is folded up in a manner such that the base end of the link strap is disposed at a side of the folded curtain airbag proximate the inside of the vehicle cabin. In that case, the link strap may extend around the lower side of the folded curtain airbag toward the vehicle body. In such an alternative structure, even if the base end of the link strap is disposed at the vehicle-cabin-side of the folded curtain airbag, there is little chance that the link strap may complicate the installation process for attaching the folded curtain airbag to the vehicle body since the link strap extends around the lower side of the folded curtain airbag toward the vehicle body. Furthermore, when the curtain airbag is being deployed downward, the curtain airbag pushes the base end of the link strap downward, whereby the link strap can move downward smoothly.

The priority application, Japanese Patent Application No. 2004-191675 filed on Jun. 29, 2004, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A curtain airbag device for a vehicle, comprising:
   a curtain airbag folded so as to extend longitudinally in a front-rear direction of a vehicle, wherein the curtain airbag is arranged to deploy downward along an inner side surface of the vehicle, wherein the folded curtain airbag comprises two sheets combined together;
   a gas generator for supplying the curtain airbag with gas in order to inflate the curtain airbag;
   a guiding element extending in a vertical direction and mounted on an interior of the vehicle, the guiding element guiding the curtain airbag when the curtain airbag is being deployed downward; and
   a linking member which protrudes from a lower edge of the curtain airbag, wherein the linking member is attached to an exterior of the guiding element so that the linking member is guided along the exterior of the guiding element, wherein the linking member extends in an elongated manner and is a segment of the combined sheets of the airbag; and
   wherein a base end of the linking member is disposed at a side of the folded curtain airbag proximate to a vehicle body.

2. The curtain airbag device of claim 1, wherein the guiding element is mounted on a pillar in the interior of the vehicle.

3. The curtain airbag device of claim 2, wherein the guiding element is a vertical rod.

4. The curtain airbag device of claim 1, wherein the linking member is tied to the guiding element.

5. The curtain airbag device of claim 1, wherein the linking member includes a ring at an end of the linking member, and wherein the guiding element passes through the ring and attaches the linking member to the guiding element.

6. A curtain airbag device for a vehicle, comprising:
   a curtain airbag folded so as to extend longitudinally in a front-rear direction of a vehicle, wherein the curtain airbag is arranged to deploy downward along an inner side surface of a vehicle cabin, wherein the folded curtain airbag comprises two sheets combined together;
   a gas generator for supplying the curtain airbag with gas in order to inflate the curtain airbag;
   a guiding element extending in a vertical direction and mounted on an interior of the vehicle, the guiding element guiding the curtain airbag when the curtain airbag is being deployed downward; and
   a linking member which protrudes from a lower edge of the curtain airbag, wherein the linking member is attached to an exterior of the guiding element so that the linking member is guided along the exterior of the guiding element, wherein the linking member extends in an elongated manner and is a segment of the combined sheets of the airbag; and
   wherein a base end of the linking member is disposed at a side of the folded curtain airbag proximate to an inside of a vehicle cabin, and wherein the linking member extends from the side of the folded curtain airbag proximate to the inside of the vehicle cabin and around a lower side of the folded curtain airbag toward a vehicle body.

7. The curtain airbag device of claim 6, wherein the guiding element is mounted on a pillar in the interior of the vehicle.

8. The curtain airbag device of claim 7, wherein the guiding element is a vertical rod.

9. The curtain airbag device of claim 6, wherein the linking member is tied to the guiding element.

10. The curtain airbag device of claim 6, wherein the linking member includes a ring at an end of the linking member, and wherein the guiding element passes through the ring and attaches the linking member to the guiding element.

11. A curtain airbag device for a vehicle, comprising:
   a curtain airbag that deploys downward along an inner side surface of the vehicles, wherein the folded curtain airbag comprises two sheets combined together;
   a gas generator for supplying the curtain airbag with gas in order to inflate the curtain airbag;
   a guiding element extending in a vertical direction and mounted on an interior of the vehicle, the guiding element guiding the curtain airbag when the curtain airbag is being deployed downward; and
   a linking member which protrudes from a lower edge of the curtain airbag, wherein the linking member is attached to an exterior of the guiding element so that the linking member is guided along the exterior of the guiding element, and wherein the linking member extends in an elongated manner and is a segment of the combined sheets of the airbag.

* * * * *